(12) United States Patent
Davis et al.

(10) Patent No.: US 7,509,209 B2
(45) Date of Patent: Mar. 24, 2009

(54) METHODS AND APPARATUS FOR OPERATION OF MULTIPLE FUEL ENGINES

(75) Inventors: Frank J. Davis, Riverdale, GA (US); Jozef Turlej, Chicopee, MA (US)

(73) Assignee: Engine Control Technology, LLC, Fayetteville, GA (US)

(*) Notice: Subject to any disclaimer, the term of this patent is extended or adjusted under 35 U.S.C. 154(b) by 0 days.

(21) Appl. No.: 11/751,192

(22) Filed: May 21, 2007

(65) Prior Publication Data
US 2007/0295316 A1 Dec. 27, 2007

Related U.S. Application Data

(63) Continuation of application No. 10/668,589, filed on Sep. 23, 2003, now Pat. No. 7,222,015.

(60) Provisional application No. 60/413,269, filed on Sep. 24, 2002.

(51) Int. Cl.
*G06F 17/00* (2006.01)
*F02D 41/00* (2006.01)

(52) U.S. Cl. .................. 701/103; 123/689; 701/104

(58) Field of Classification Search ............ 701/103, 701/104, 108, 110, 114, 115; 123/304, 356, 123/357, 358, 375, 379, 525, 526, 27 GE, 123/204, 689
See application file for complete search history.

(56) References Cited

U.S. PATENT DOCUMENTS

| 4,463,734 A | 8/1984 | Akeroyd |
| 4,517,928 A * | 5/1985 | Wolters .......... 123/27 GE |
| 4,603,674 A | 8/1986 | Tanaka |
| 5,224,457 A | 7/1993 | Arsenault et al. |
| 5,370,097 A | 12/1994 | Davis |
| 5,450,829 A | 9/1995 | Beck |
| 5,526,786 A | 6/1996 | Beck et al. |
| 5,937,800 A | 8/1999 | Brown et al. |
| 5,999,888 A | 12/1999 | Aubee |
| 6,073,592 A | 6/2000 | Brown et al. |
| 6,092,504 A * | 7/2000 | Barnes et al. ............ 123/357 |
| 6,145,494 A | 11/2000 | Klopp |
| 6,230,683 B1 | 5/2001 | zur Loye et al. |
| 6,234,149 B1 * | 5/2001 | Mills et al. ............ 123/486 |

(Continued)

*Primary Examiner*—Willis R. Wolfe, Jr.
*Assistant Examiner*—Johnny H. Hoang
(74) *Attorney, Agent, or Firm*—Alan G. Towner, Esq.; Pietragalio Gordon Alfano Bosick & Raspanti, LLP

(57) ABSTRACT

Methods and apparatus are disclosed for operation of a multiple fuel engine, which runs on a combination of two or more fuels. An electronic control unit (ECU) may be connected to the existing components of an engine system in order to control operation of the multiple fuel engine. The engine system may be mechanically governed or electronically controlled. The ECU inputs operating characteristics of the engine system, determines governing characteristics for multiple fuel operation based on the operating characteristics, and controls the amounts of fuel delivered to the engine based on the governing characteristics. In a preferred embodiment, a dual fuel engine operates using diesel as a first fuel and natural gas as a second fuel. The operating characteristics may include engine speed, throttle position, engine exhaust temperature, gas pressure of the second fuel, gas temperature of the second fuel, boost pressure of an intake manifold, or engine coolant temperature.

1 Claim, 17 Drawing Sheets

U.S. PATENT DOCUMENTS 6,314,948 B1 11/2001 Cathcart
6,543,395 B2 4/2003 Green
6,694,242 B2 2/2004 Wong

* cited by examiner

METHODS AND APPARATUS FOR OPERATION OF MULTIPLE FUEL ENGINES

CROSS-REFERENCE TO RELATED APPLICATIONS

This application is a continuation of U.S. patent application Ser. No. 10/668,589, filed Sep. 23, 2003, which claims the benefit of U.S. Provisional Patent Application Ser. No. 60/413,269, filed Sep. 24, 2002, both of which are incorporated herein by reference.

FIELD OF THE INVENTION

The present invention relates to methods and apparatus for operation of a multiple fuel engine using an electronic control unit (ECU). The multiple fuel system may be applied to either mechanically governed or electronically controlled engines. In one embodiment, an internal combustion engine is converted into a dual fuel engine system which operates on a combination of two fuels. In a particular embodiment, diesel is used as the first fuel and natural gas as the second fuel.

BACKGROUND INFORMATION

The air pollution problems inherent in the operation of gasoline fueled and diesel oil fueled internal combustion engines are well known. For this reason various emission control devices are presently in use, and may be required by federal regulations in order to reduce the amount of pollutants discharged into the atmosphere by internal combustion engines. These emission control devices, however, only remove a portion of the pollutants and are subject to deterioration with the passage of time. Also, they often hinder engines from operating at peak efficiencies.

Natural gas is also sometimes used as a fuel for internal combustion engines. It has the capability of producing less combustion pollutants and decreasing engine operating costs without complex emission control devices, and its use reduces the rate of world fossil fuel consumption.

Since the current transportation infrastructure does not include large numbers of widely disbursed retail suppliers of natural gas for vehicles, it has been impractical to produce vehicles that are fueled solely by gaseous fuels like natural gas due to range limitations. It is more practical to equip vehicles with a supply of both a liquid fuel such as gasoline or diesel fuel and an auxiliary supply of gaseous fuel such as natural gas. To do that efficiently it is preferred that as little retrofitting be done as possible to existing fuel intake systems and configurations.

Various systems had been developed for mixing gaseous fuels with liquid fuels. For example, systems have been designed which entrain gaseous fuel through a gas metering valve into air supplied to the air inlet manifold of a diesel engine. This combination of air and fuel is then mixed with the diesel fuel prior to combustion. Exemplary of this type of system is that shown in U.S. Pat. No. 4,463,734. Since these systems control the flow of gaseous fuel by the volume of air entering the engine, there is a direct and constant gaseous fuel to diesel fuel ratio. However, because different load conditions can occur at various engine speeds, this type of system does not always provide a mixture which results in maximum efficiency.

U.S. Pat. No. 5,370,097, which is incorporated herein by reference, discloses a system for controlling the flow of gaseous fuel and the flow of liquid fuel into an internal combustion engine to increase efficiency and output.

SUMMARY OF THE INVENTION

In accordance with an embodiment of the present invention, an engine system is converted into a multiple fuel engine which operates on a combination of two or more fuels. In accordance with another embodiment, the multiple fuel engine is provided as original equipment on various types of vehicles. The multiple fuel system may be applied to either mechanically governed or electronically controlled engines. In a preferred embodiment, the multiple fuel system operates on diesel as a first fuel and natural gas as a second fuel.

An aspect of the present invention is to provide an electronic control unit (ECU) for a multiple fuel engine. The ECU is capable of inputting operating characteristics of the engine system and controlling amounts of a first and second fuel for delivery to the engine system based on at least one of the operating characteristics. The operating characteristics may include gas pressure of the second fuel, gas temperature of the second fuel, boost pressure of an intake manifold and/or engine coolant temperature.

Another aspect of the present invention is to provide a method for controlling delivery of fuel to a multiple fuel engine. The method includes providing an ECU, inputting operating characteristics of an engine system, and controlling amounts of a first and second fuel for delivery to the engine based on at least one of the operating characteristics.

A further aspect of the present invention is to provide a method for calibrating an ECU for a multiple fuel engine. The method includes inputting operating characteristics of the engine system to the ECU, determining governing characteristics for multiple fuel operation based on the operating characteristics, and controlling amounts of a first and second fuel for delivery to the engine based on the governing characteristics.

Another aspect of the present invention is to provide a method for converting an engine system of a vehicle to a multiple fuel engine. The method includes installing an ECU. In a particular embodiment, the method further comprises mounting a storage tank for a second fuel and installing a second fuel line in flow communication between the storage tank for the second fuel and the engine.

A further aspect of the present invention is to provide a multiple fuel engine comprising an engine, a storage tank for a first fuel, a first fuel line in flow communication between the storage tank for the first fuel and the engine, a storage tank for a second fuel, a second fuel line in flow communication between the storage tank for the second fuel and the engine, and an ECU.

Another aspect of the present invention is to provide control software or other types of computer readable media such as computer random access memory for operating a multiple fuel engine.

These and other aspects of the present invention will be more apparent from the following description.

DETAILED DESCRIPTION

Figure 1:
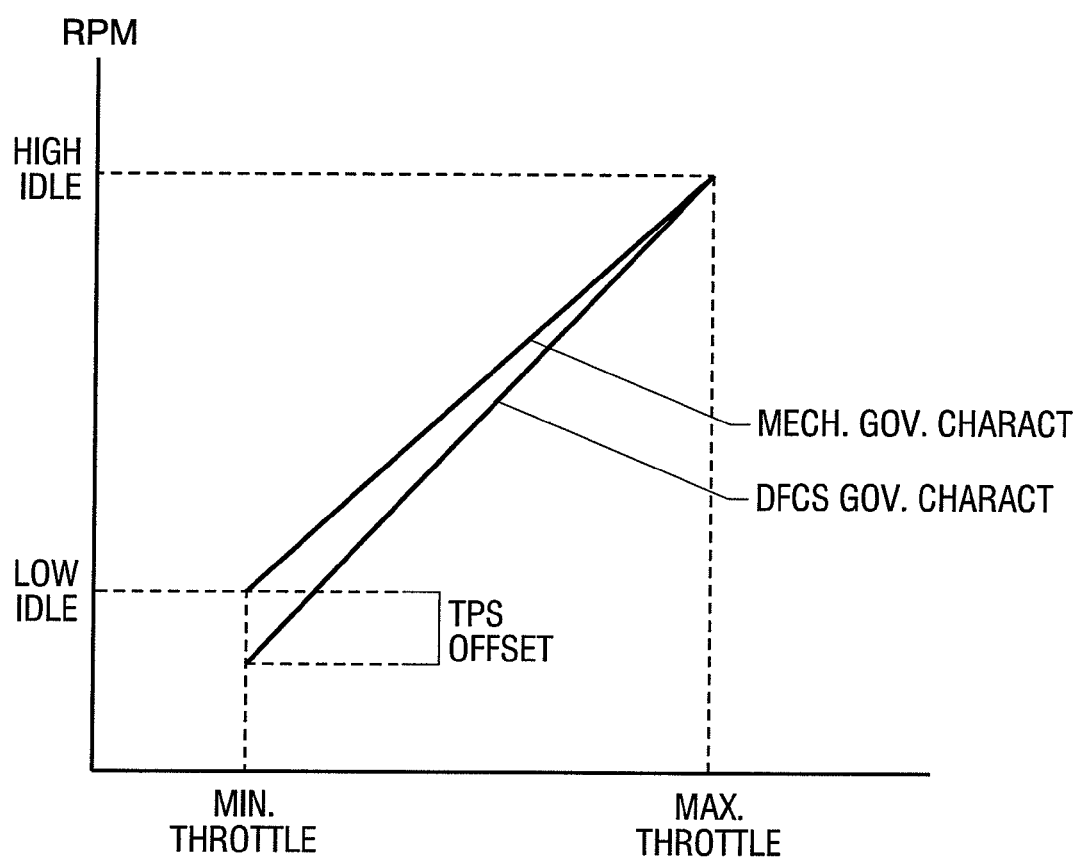
FIG. 1 is a graph of engine speed (r.p.m.) versus throttle position for a mechanically governed engine.

An embodiment of the present invention provides methods and apparatus for converting engine systems into multiple fuel engines, which operate on a combination of two or more fuels. For example, a dual fuel engine may operate using a "first fuel" and a "second fuel". In dual fuel mode, the engine runs by combining the first and second fuel; otherwise, the engine runs in single fuel mode using the first fuel alone. In a preferred embodiment, a dual fuel engine operates using diesel as the first fuel and natural gas as the second fuel. Although the embodiments described herein focus on the use of diesel and natural gas, any suitable gaseous or liquid fuel may be used for either fuel, including petroleum-based and non-petroleum-based fuels.

The embodiments described herein focus on the use of an electronic control unit (ECU) for conversion of an existing engine system into a multiple fuel engine. The "engine system" includes all existing engine parts, pumps, fuel tanks, metering devices, valves, and other components that are required to build a multiple fuel engine and that are not included as part of the ECU. For an electronically controlled engine, the engine system also includes an original equipment manufacturer (OEM) controller.

Typically, the conversion process does not modify the existing engine, which maintains substantially the same power and torque performance. Instead, the ECU is connected to the existing engine system to manage fuel delivery for reliable power and emissions control over a wide range of operating conditions. For example, the engine may run entirely on diesel (the "first fuel") until a switch indicates that multiple fuel mode is desired. When the switch is turned on, the ECU operates to deliver sufficient natural gas (the "second fuel") to run the engine and the minimum amount of diesel fuel required to initiate combustion (i.e., the minimum amount required for pilot ignition of the natural gas). In adjusting the amounts of diesel and natural gas delivered to the engine, the ECU strives to minimize emissions while maximizing performance.

The existing engine system may be mechanically governed or electronically controlled. For a mechanically governed engine, the ECU includes multiple sensors that record the engine system's "operating characteristics", which may include engine speed (r.p.m.), engine (or exhaust) temperature, throttle position, gas pressure of the second fuel, gas temperature of the second fuel, boost pressure of the diesel injector intake manifold and/or engine coolant temperature. For an electronically controlled engine, the ECU may receive inputs for such operating characteristics. However, instead of dedicated sensors, at least some of the operating characteristic inputs may come directly from the existing OEM controller. Based on these operating characteristics, the ECU may calibrate itself by determining the "governing characteristics" of the multiple fuel engine in a process known as "mapping". Governing characteristics are engine parameters that define multiple fuel system performance and correspond to each operating characteristic recorded. Thus, for a given operating characteristic such as engine speed, the ECU maps a corresponding governing characteristic for engine speed that defines dual fuel operation. The ECU then uses the governing characteristics to determine when to adjust the delivery of each fuel and by what amount. A target ratio at maximum load and torque is, for example, 80 percent natural gas and 20 percent diesel. Around this target ratio, noxious gas is significantly reduced and visible smoke is virtually eliminated.

The ECU may be installed without removing the existing mechanical governor. As a result, the speed governing characteristic should be programmed close to, but not higher than, the speed operating characteristic of the mechanical governor. In other words, the ECU preferably controls the engine speed during multiple fuel operation at an r.p.m. close to but not exceeding the r.p.m. of the mechanical governor, as shown in FIG. 1. This avoids the mechanical governor kicking in during multiple fuel operation and shutting off the supply of the first fuel, e.g., diesel, a condition known as engine surge.

Figure 2:
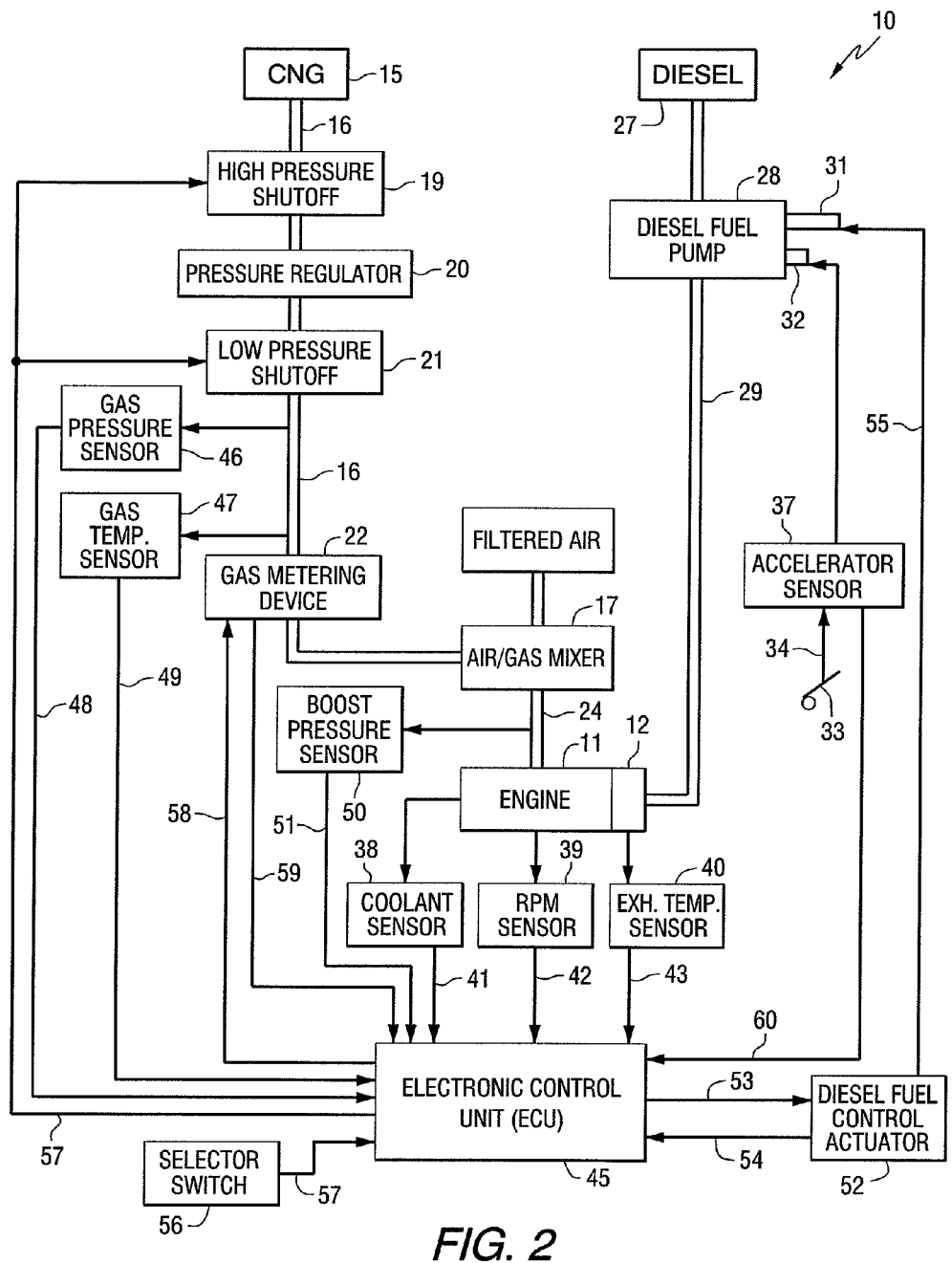
FIG. 2 is a schematic diagram of a dual fuel engine converted from a mechanically governed engine system.

FIG. 2 is a schematic diagram of a dual fuel engine system that was converted from a mechanically governed engine. As shown, a dual fuel system 10 is used for supplying a first fuel (e.g. diesel fuel) alone or in combination with a second fuel (e.g. compressed natural gas) to an internal combustion engine 11 having fuel injectors 12. The fuel injectors 12 inject fuel directly into the cylinders of the engine. In FIG. 2, the first fuel is diesel while the second fuel is compressed natural gas (CNG). However, any suitable fuel may be used for the first and second fuels.

The system 10 includes a high pressure gas storage tank 15 which supplies CNG through a conduit 16 to an air/gas mixer 17 mounted to induce natural gas into an airstream entering the air intake of the engine 11. The air/gas mixer 17 may be any conventional mixer such as model SP4D of Combustion Lab's Inc. of Riverdale, Ga. A high pressure shutoff valve 19, a pressure regulator 20, a low pressure shutoff valve 21 and a fuel metering actuator 22 are coupled in series to the conduit 16 between the tank 15 and the mixer 17 to control the flow of the natural gas. The pressure regulator 20 reduces the pressure of the natural gas to a selected pressure, depending upon the type and size of engine used with the system 10. The fuel metering actuator 22 may be any suitable actuator such as model DYNK 10322-800 of Barber Colman Company of Loves Park, Ill. Filtered ambient air is supplied to the mixer 17 through a conduit 24.

The system 10 also includes a diesel fuel storage tank 27 coupled to a fuel pump 28 which supplies diesel fuel through a conduit 29 to the engine fuel injectors 12. The fuel pump 28 is typically driven by the engine, and its output is related to the speed of the engine. The fuel pump 28 has a conventional mechanical governor (not shown), a shutoff lever 31 and a throttle 32. The shutoff lever 31 may be used to limit the flow of diesel fuel pumped by pump 28 just as does the throttle 32. The effective use of two throttles may be employed to prevent diesel fuel from entering the engine when the engine is not operating. The throttle 32 is coupled to an accelerator pedal 33 by a movable cable 34. An accelerator sensor 37 is employed to sense the position of the manual accelerator pedal 33 and thereby the throttle 32. The tank 27, pump 28, conduit 29, throttle 32, shutoff lever 31, accelerator pedal 33 and cable 31 may be standard equipment on automobiles having diesel engines.

The existing components are converted to a dual fuel engine system through the use of an ECU 45. An engine coolant temperature sensor 38, an engine speed or r.p.m. sensor 39, and an exhaust temperature sensor 40 may be coupled with the engine 11 and with the ECU 45 by means of signal lines 41, 42 and 43, respectively. A gas pressure sensor 46 and a gas temperature sensor 47 may be coupled with the gas supply 16 and with the ECU 45 by means of signal lines 48 and 49, respectively. A boost pressure sensor 50 may be coupled with the injector manifold intake 12 and with the ECU 45 by means of signal line 51.

The ECU 45 is coupled to a diesel fuel control actuator 52 by signal output line 53 and a feedback line 54. The diesel fuel control actuator 52 is in turn mechanically coupled to the shutoff lever 31 by a cable 55. A bi-positional fuel selector 56 is provided that is coupled to the ECU 45 by a signal line 57. The ECU 45 is also coupled to both the shutoff valves 19 and 21 by control line 57, to the fuel metering actuator 22 by a control line 58 and by feedback line 59, and finally with the accelerator sensor 37 by a line 60.

To initially calibrate the system the selector switch 53 is positioned "off" so that the engine operates on diesel fuel only. The engine is then operated with the fuel pump shutoff lever 31 fully opened and with the throttle 32 fully opened by actuator 47 so as to bring the engine to its maximum engine speed. A load is then placed upon the engine, as with a conventional dynamometer, to reduce the engine speed by a predetermined incremental amount, typically about 200 r.p.m. The engine's torque, horsepower and exhaust temperature is next determined by the dynamometer and stored within the memory of the ECU 45. The engine is incrementally lugged down by the predetermined increment until it ceases to operate due to the load on the engine. At each incremental engine speed the resultant maximum engine torque, horsepower and exhaust temperature are recorded and stored in the ECU 45 memory. Based on these operating characteristics, the ECU 45 determines governing characteristics for dual fuel operation. This process is referred to as mapping the engine. In a preferred embodiment, the ECU 45 may store up to 256 r.p.m. values throughout the r.p.m. range.

Next, the selector switch 53 is positioned "on" so that the engine operates on both diesel fuel and natural gas. The engine is brought to idle with the shutoff lever 31 fully opened. The shutoff lever is then slowly closed by the action of actuator 47 so as to restrict the flow of diesel fuel therethrough while simultaneously the action of fuel metering actuator 22 increases the flow of natural gas therethrough to compensate for the reduction in diesel fuel. The actuators 22 and 47 are moved in this manner until the engine speed cannot be maintained due to a below minimal quantity of diesel fuel for combustion. This minimal amount of diesel fuel is commonly referred to as the "pilot fuel". The position of the actuator 47 and the engine speed are stored in the ECU 45 memory as a reference value.

The shutoff lever 31 is then returned to a fully opened position and the throttle 32 is moved to a position which increases the engine speed, by the predetermined incremental amount, to the next engine speed which was previously mapped. The actuators 22 and 47 are again moved, as previously described, to determine and store the pilot fuel position of the actuator 47 for this particular engine speed. This process is preferably repeated along the entire range of engine speeds at each previously stored engine speed and corresponding reference values are recorded. It has been found that at a minimum the pilot fuel amounts to approximately 5% of the total quantity of fuels.

With the ECU 45 preprogrammed with a mapping of the engine's torque and horsepower for each engine speed, the ECU 45 preferably regulates the flows of diesel fuel and natural gas in a manner which does not surpass the mapped conditions so as to overpower the engine. In other words, the combination of the two fuels does not produce an engine torque or horsepower greater than that produced by the engine conventionally operating on diesel fuel only. In a preferred embodiment, the ECU 45 will consider gas temperature, gas pressure, and intake manifold boost pressure to adjust the diesel to gas ratio according to changing environmental conditions. Engine exhaust and coolant temperatures may also be considered because gas is preferably injected when the engine is warm. With the ignition of the engine 11 turned off the natural gas shutoff valves 19 and 21 and the diesel pump shutoff lever 31 are closed so that neither natural gas nor diesel fuel may enter the engine.

To start and operate the engine 11 solely on diesel fuel the selector 53 is positioned off. With the selector in this position the shutoff valves 19 and 21 remain closed so as to prevent natural gas from entering the engine. As the ignition system of the engine is activated the shutoff lever 31 is fully opened so that diesel pump 28 may force diesel fuel through conduit 29 into the injectors 12 of the engine. The flow rate of the diesel fuel supplied to the engine may be determined by the mechanical governor and the position of the throttle 32. Air used in combination with the diesel fuel enters the engine through the air/gas mixer 17.

To start and operate the engine 11 with the fuel system 10 in a dual fuel mode the selector 53 is selectively positioned on, thereby energizing the ECU 45. While starting the engine it is undesirable to have natural gas entering it, as this may cause the engine to "lock up" due to the pressure within the cylinders. Therefore, should the r.p.m. sensor 40 indicate that the engine is not operating above a preselected minimum speed the ECU 45 signals the shutoff valves 19 and 21 to remain closed. Once the engine is operating above the preselected minimum speed, the ECU 45 energizes the diesel fuel control actuator 47 and opens shutoff valves 19 and 21 to allow natural gas through the pressure regulator 20 and metering actuator 22.

The quantity of each fuel supplied to the engine is determined by the ECU 45 which may do so by regulating the flow of natural gas through the fuel metering actuator 22 and the flow of diesel fuel from pump 28, which is determined by the selective positioning of its throttle 32 and shutoff lever 31. The ECU 45 may regulate the flows in response to information provided by the r.p.m. sensor 40 and the accelerator sensor 37.

Figure 3:
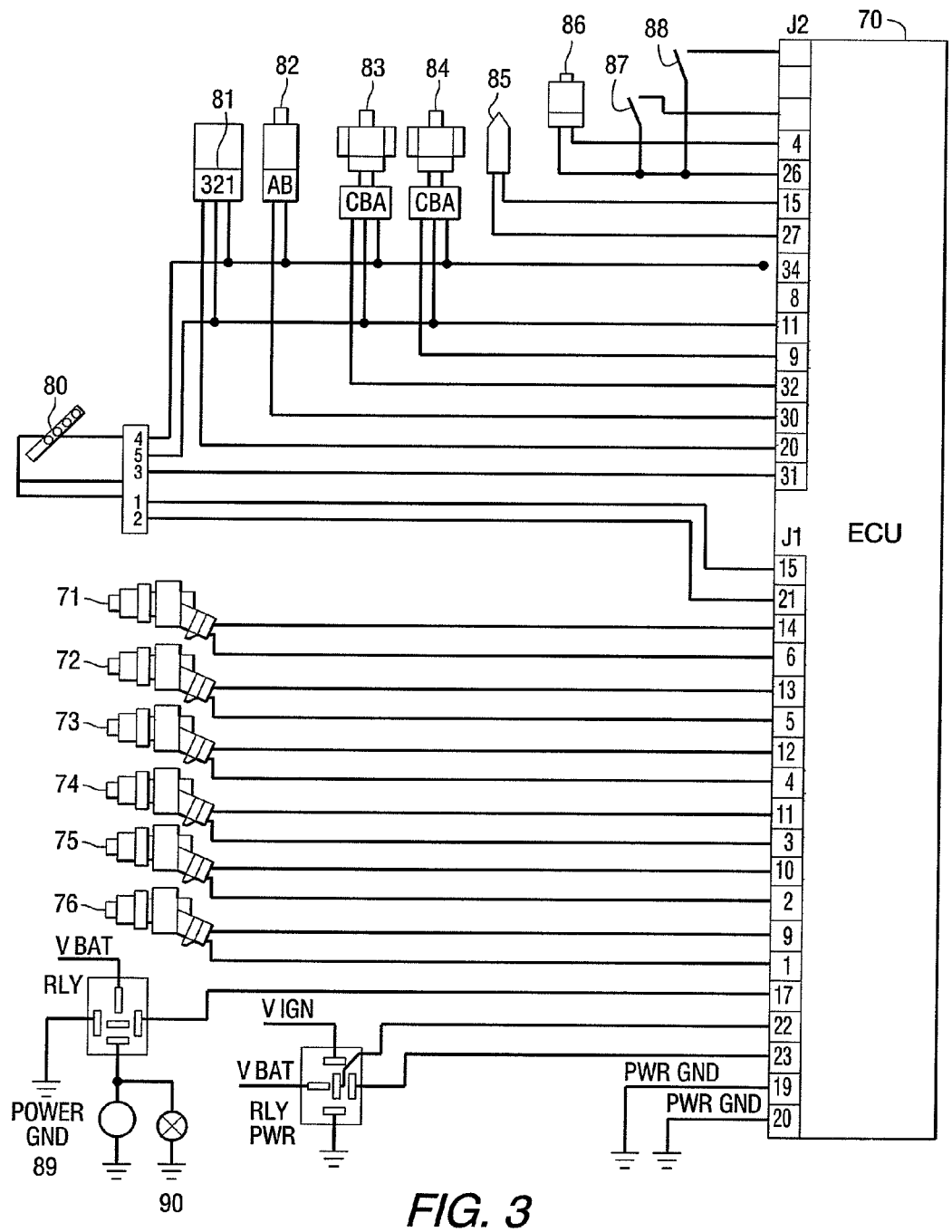
FIG. 3 is a schematic diagram of an ECU for conversion of a mechanically governed engine system into a dual fuel engine.

FIG. 3 is a schematic diagram of a typical ECU 70 for conversion of a mechanically governed engine into a dual fuel engine system. As shown, natural gas is controlled with up to six injectors 71-76 injecting to an intake manifold. Alternatively, a proportional valve may be used to control the natural gas. The ECU 70 contains a suitable controller, such as a 32-bit microcontroller, for fast calculations of required engine control parameters. The ECU 70 also contains suitable memory, such as random access memory. The program may be stored entirely in flash memory and if desired can be replaced or upgraded in the field. EEPROM memory may be used for storing of calibration data, maps and fault codes. One servomotor output 80 may be dedicated for control of the diesel pilot positioner. Analog inputs may be provided for reading system sensors such as the throttle position sensor 81, engine speed sensor 82, gas pressure sensor 83, manifold boost pressure sensor 84, exhaust temperature sensor 85 and coolant temperature sensor 86. Digital inputs may also be included for reading r.p.m., speed, timing, binary sensors, and other logic signals depending on the system configuration. In addition, the ECU may contain a system enable switch 87 and a power take-off (PTO) enable switch 88. FIG. 3 also depicts a gas valve 89 and a system on light 90.

An RS422 full duplex port (not shown) may be provided for communication with programming and diagnostic software running on a laptop computer. Control software may be programmed or customized from generic software depending on the requirements of a specific application. Typical software used for mechanically governed engines includes idle control, torque mapping, engine r.p.m. mapping, diesel pilot mapping, gas pressure compensation, manifold pressure compensation, and PTO control. The software performs a diagnostic of each sensor. In case of sensor failure, the system is disabled and the fault code recorded. The fault code can be retrieved during system troubleshooting.

The calibration software is known as Programming and Diagnostic Monitor (PDM). The software may run under Windows, typically on a laptop computer. Readings from all sensors, gas used, diesel pilot actuator position, and various status flags are displayed. Calibration data can be uploaded to the ECU directly from the screen or from files and if desired downloaded back and stored in files.

In contrast to a mechanically governed engine, an electronically controlled engine typically includes an OEM controller that includes or interfaces with existing sensors to measure certain operating characteristics. Thus, the ECU of the present invention may work in harmony with the existing OEM controller, communicating with the OEM controller via data link signals to receive the operating characteristics that the OEM controller has sensed and recorded. For those operating characteristics that the OEM controller does not sense and record, the ECU may contain its own sensors, e.g., gas pressure, gas temperature, and boost pressure sensors. Like the mechanically governed engine, the operating characteristics for the electronically controlled engine may include engine speed (r.p.m.), engine (or exhaust) temperature, throttle position, gas pressure of the second fuel, gas temperature of the second fuel, boost pressure of the injector intake manifold, and/or engine coolant temperature.

Figure 4:
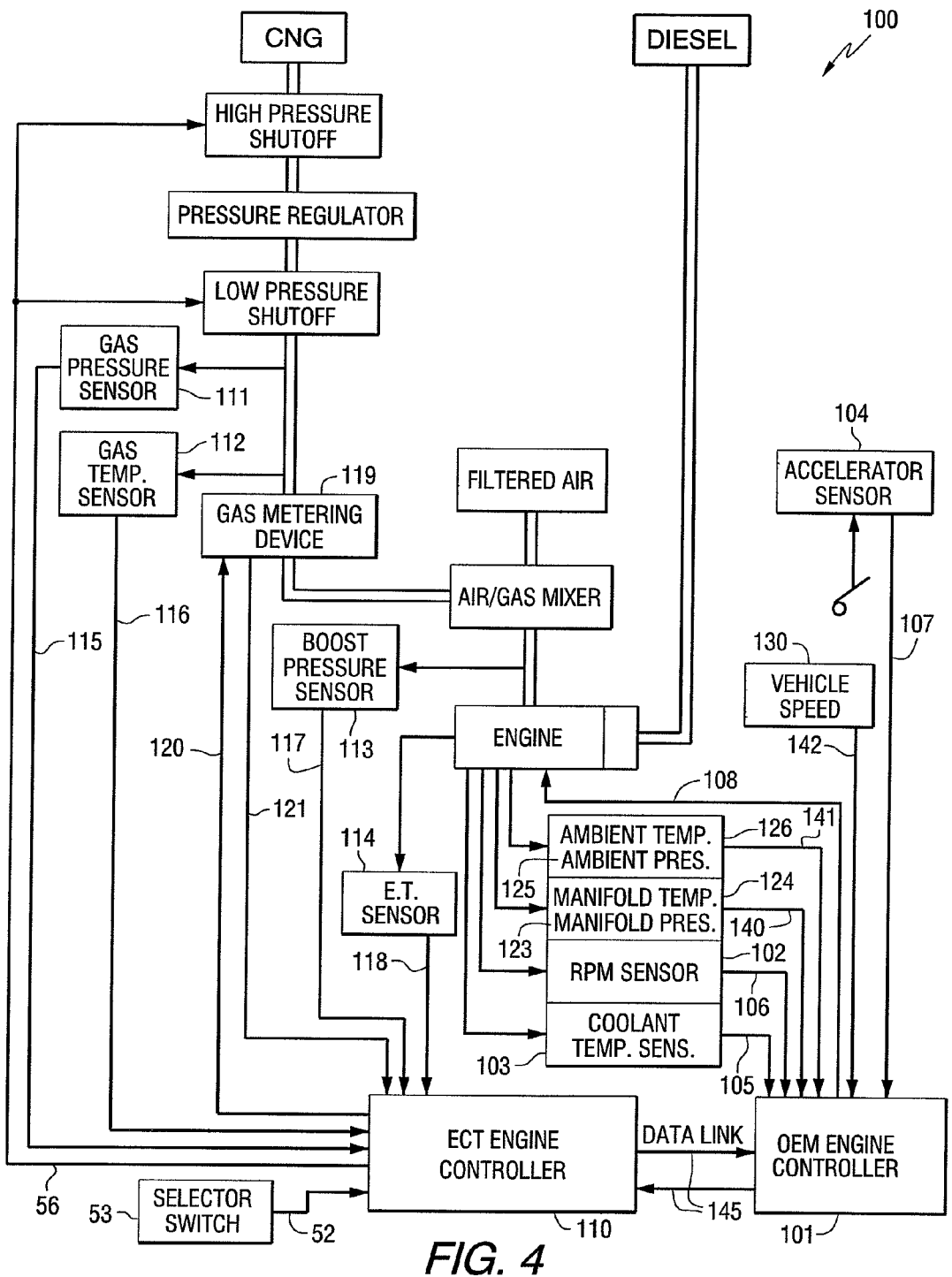
FIG. 4 is a schematic diagram of a dual fuel engine converted from an electronically controlled engine system.

FIG. 4 presents a schematic diagram of a dual fuel engine system 100 that was converted from an electronically controlled engine. Several components are identical to the components described for the mechanically governed system in FIG. 2. Components that differ are described below.

As shown in FIG. 4, an existing OEM controller 101 may receive operating characteristics from the engine speed sensor 102, the coolant temperature sensor 103, and the accelerator sensor 104, manifold pressure sensor 123, manifold temperature sensor 124, ambient pressure sensor 125, ambient temperature sensor 126, vehicle speed sensor 130, through signal lines 105, 106, 107, 140, 141, and 142, respectively.

The existing components are converted into a dual fuel engine through the use of an ECU 110, which may be coupled with a gas pressure sensor 111, a gas temperature sensor 112, a boost pressure sensor 113, and an engine exhaust temperature sensor 114 through signal lines 115, 116, 117, and 118, respectively. The ECU 110 may also be coupled with a gas metering device 119 by means of signal line 120, and may regulate the flow of gas into the engine through signal line 121. In addition, the ECU 110 may be coupled with the OEM controller 101 by means of a data link 145. In a preferred embodiment, an SAE J1939 data link is employed. The ECU 110 receives measurements of engine speed, coolant temperature, accelerator position, ambient temperature, ambient pressure, manifold temperature, manifold pressure and vehicle speed from the data link 145. In addition, the ECU 110 receives information on operation of the OEM controller 101 concerning torque control, r.p.m. control, power take off (PTO) control, and vehicle speed control as well as diagnostic information and engine configuration information.

Once the ECU 110 has received the operating characteristics, it proceeds to calibrate the system, generating governing characteristics for dual fuel operation. The ECU 110 may use the governing characteristics to regulate the flow of diesel fuel by sending signals to the OEM controller 101, and to regulate the flow of natural gas by sending signals to the gas metering device 119.

Figure 5:
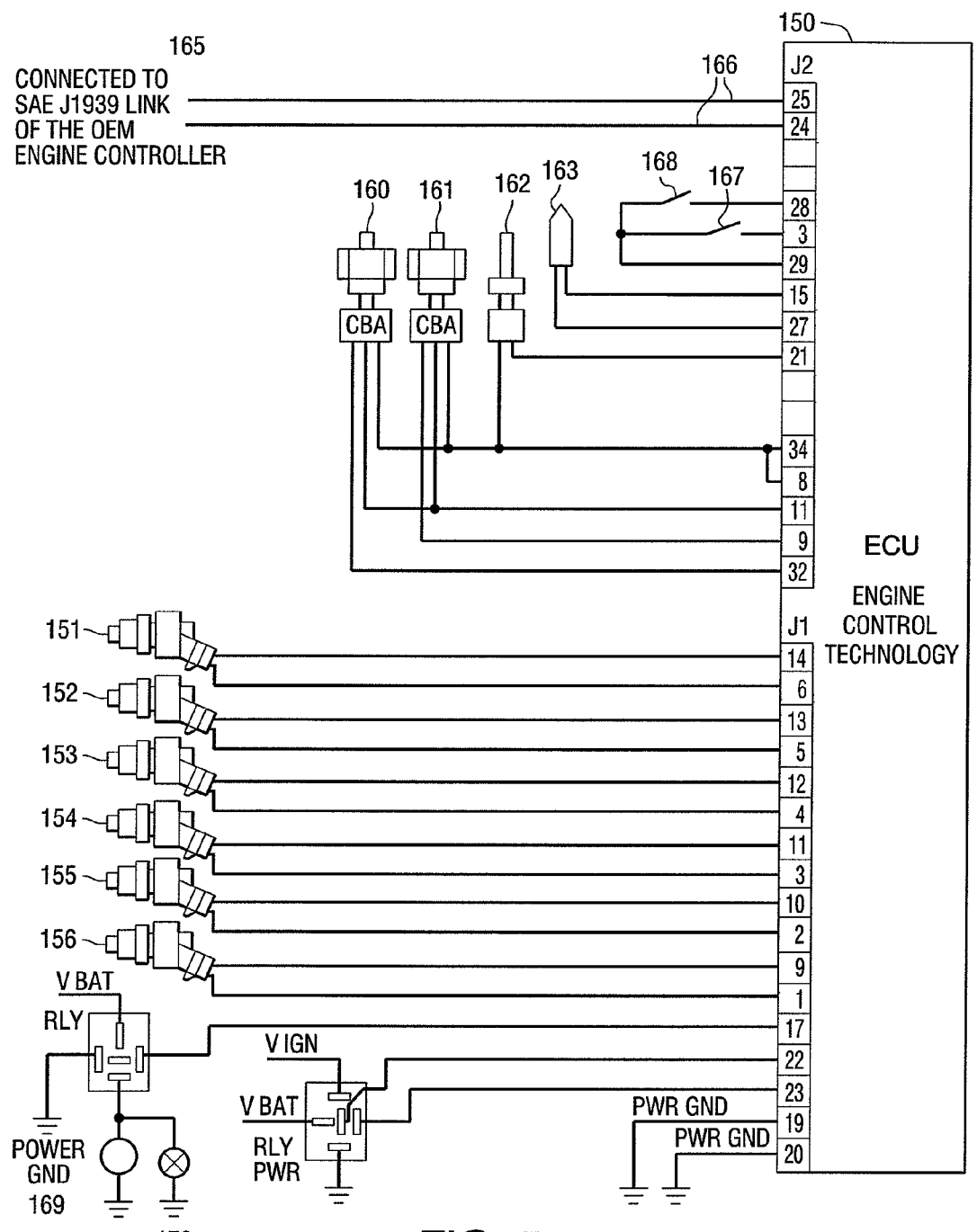
FIG. 5 is a schematic diagram of an ECU for conversion of an electronically controlled engine system into a dual fuel engine.

FIG. 5 presents a schematic diagram of a typical ECU 150 for conversion of an electronically controlled engine into a dual fuel engine system. As shown, natural gas is controlled with up to six injectors 151-156 injecting to an intake manifold. Alternatively, a proportional valve may be used to control the natural gas. Port injection of natural gas to the intake manifold may also be used. The ECU 150 contains a suitable controller, such as a 32-bit microcontroller, for fast calculations of required engine control parameters. The ECU 150 also contains suitable memory. The program may be stored entirely in flash memory and if desired can be replaced or upgraded in the field. EEPROM memory may be used for storing of calibration data, maps, and fault codes. Analog inputs may be provided for reading system sensors such as the gas pressure sensor 160, manifold boost pressure sensor 161, gas temperature sensor 162, and exhaust temperature sensor 163. Engine speed, coolant temperature, and throttle position may be read from a data link connection of the OEM controller 165. The ECU 150 may also contain a CAN port 166 for communication with the data link 165. In addition, the ECU may contain a system enable switch 167 and a PTO enable switch 168. FIG. 5 also depicts a gas valve 169 and a system on light 170.

An RS422 full duplex port (not shown) may be provided for communication with programming and diagnostic software running on a laptop computer. For the electronically controlled engine, the control software may be structured similar to the software for mechanical engines, except that several operating characteristics may be obtained from the data link, not the ECU's dedicated sensors.

Figure 6:
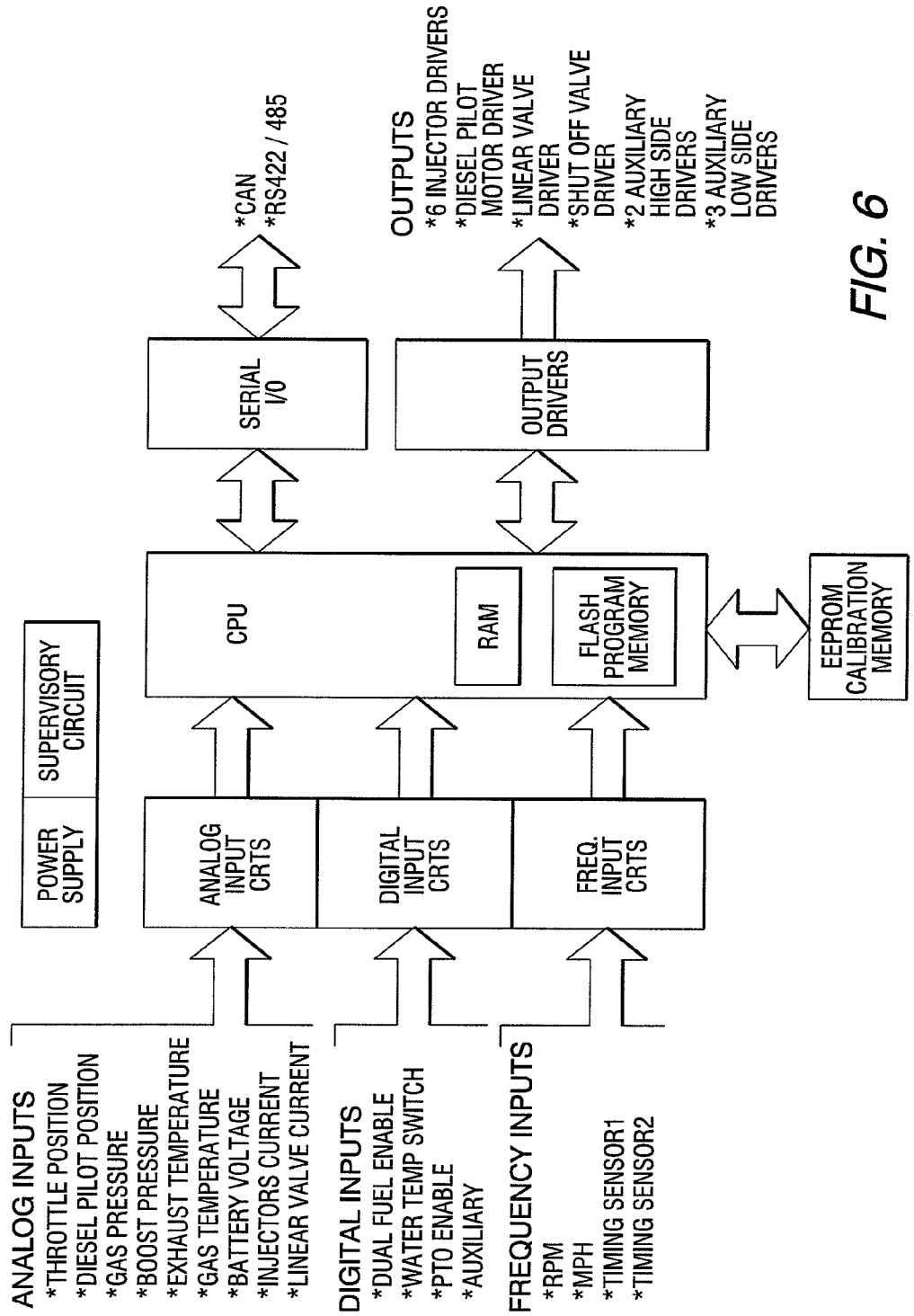
FIG. 6 is a schematic diagram depicting the hardware structure of an ECU.

The ECU hardware for mechanically controlled and electronically governed engines is essentially the same. FIG. 6 presents a schematic diagram showing the hardware structure of a typical ECU. The software for both systems differs as explained in the following information.

Figure 7A:
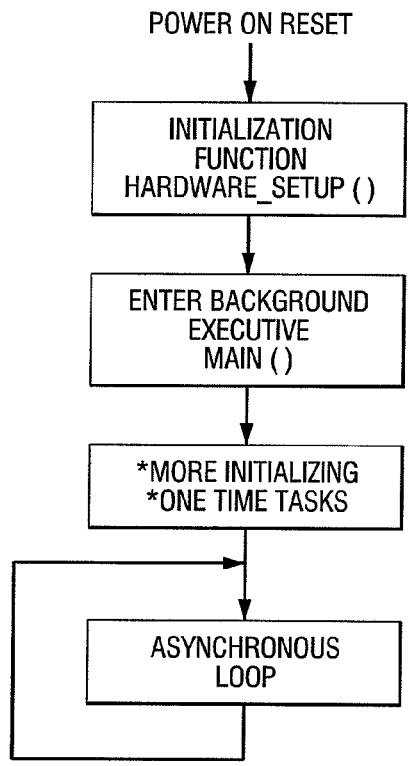
FIGS. 7a-7c are flow diagrams showing the overall ECU software structure for a mechanically governed engine.
Figure 7B:
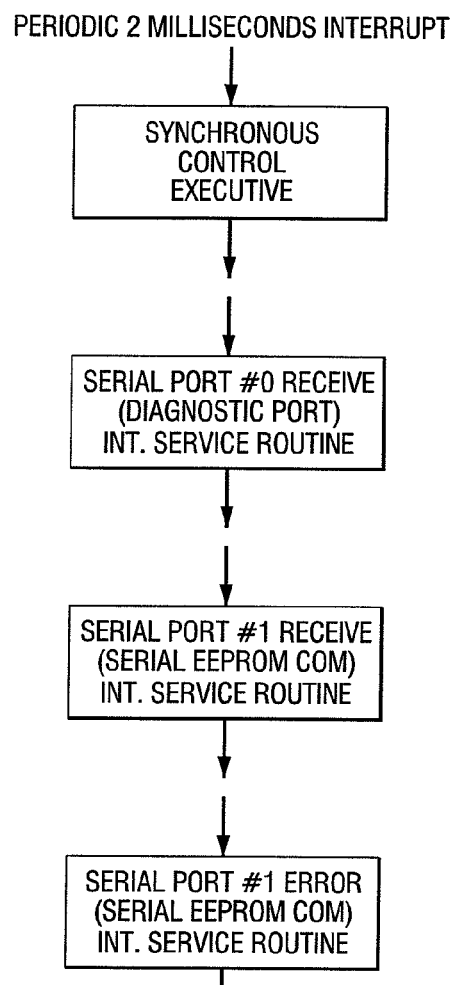
Figure 7C:
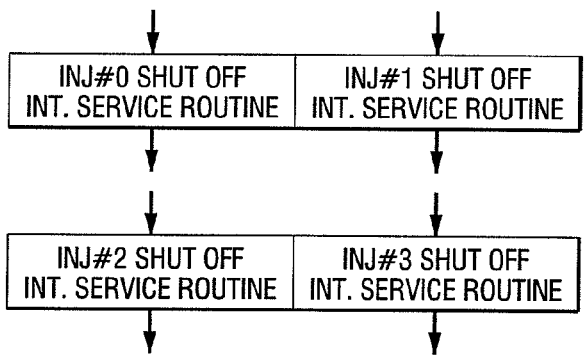

FIGS. 7a, 7b, and 7c illustrate the macrostructure of typical ECU software for a mechanically governed engine. As shown in FIG. 7a, when the power is turned on, the program is vectored to an initialization executive which performs the functions necessary to prepare the system for normal operation. Upon completion of initialization, the background executive is entered. This algorithm is asynchronous and performs functions not time prioritized, accomplished as processing time is available. One interrupt driven executive may be synchronous, running every 2 milliseconds as shown in FIG. 7b. During this synchronous control executive, the software may communicate with the OEM controller of an electronically controlled engine. The remaining interrupt driven executives may be asynchronous, servicing various internal and external events, as shown in FIG. 7c.

Figure 8A:
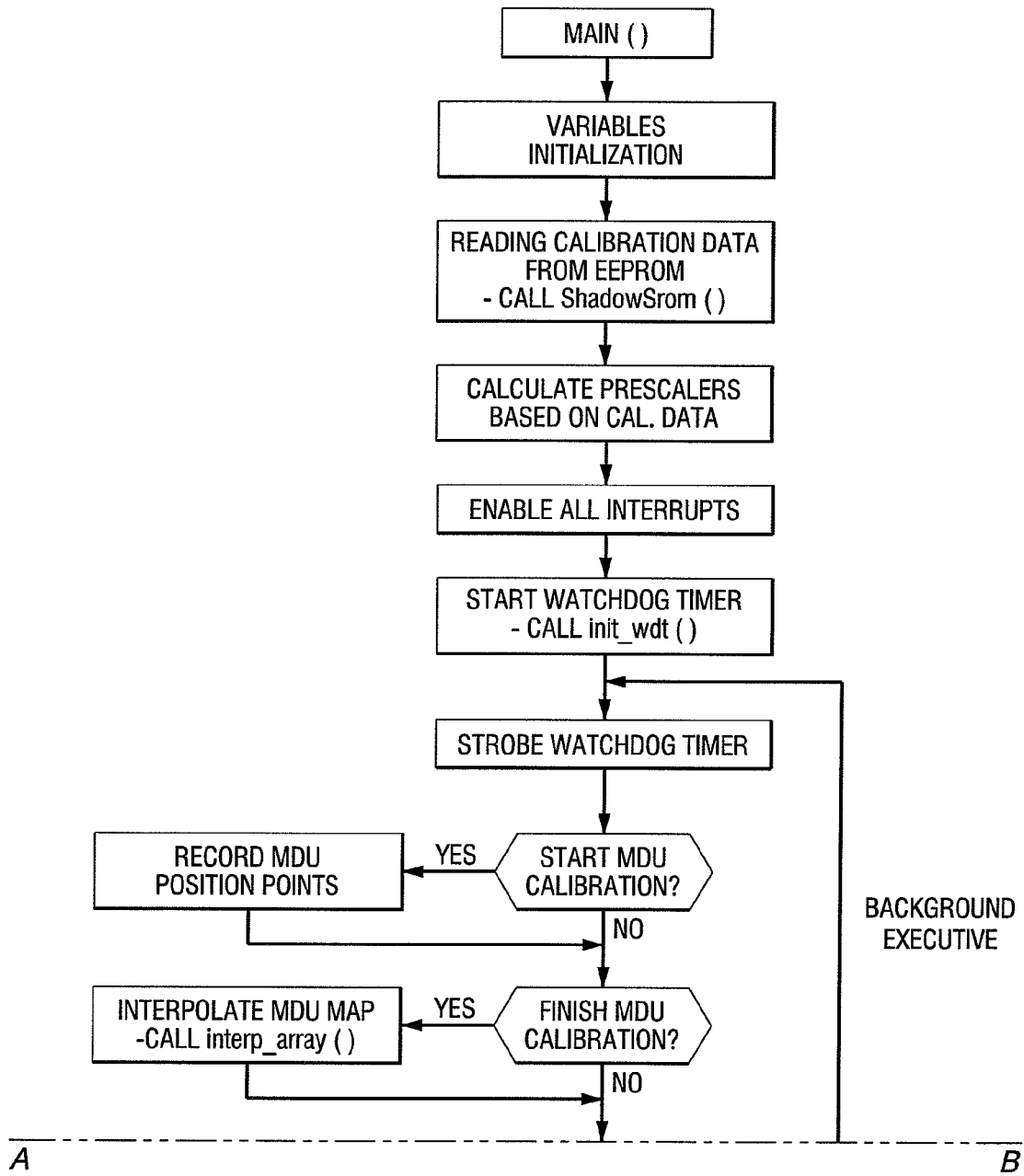
FIG. 8 is a flow diagram showing the ECU software background executive for a mechanically governed engine.
Figure 8B:
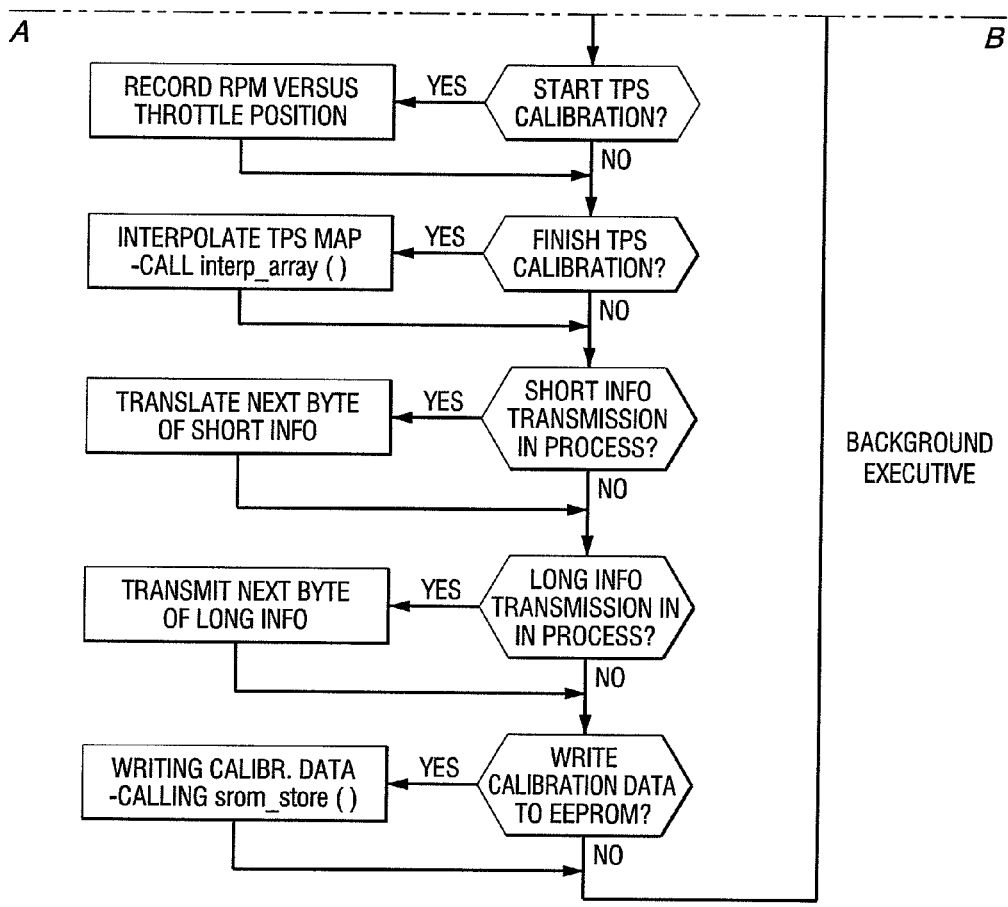

FIG. 8 presents a typical flow diagram for the background executive. In one embodiment, the function initially performs one time tasks such as reading calibration data from the EEPROM memory, starting the watchdog timer, etc., after which an asynchronous loop is entered. Asynchronous functions may include calibration of r.p.m. versus throttle position, calibration of diesel fuel versus r.p.m., initializing transmission of diagnostic data to the diagnostic monitor, strobing the watchdog timer, etc.

Figure 9:
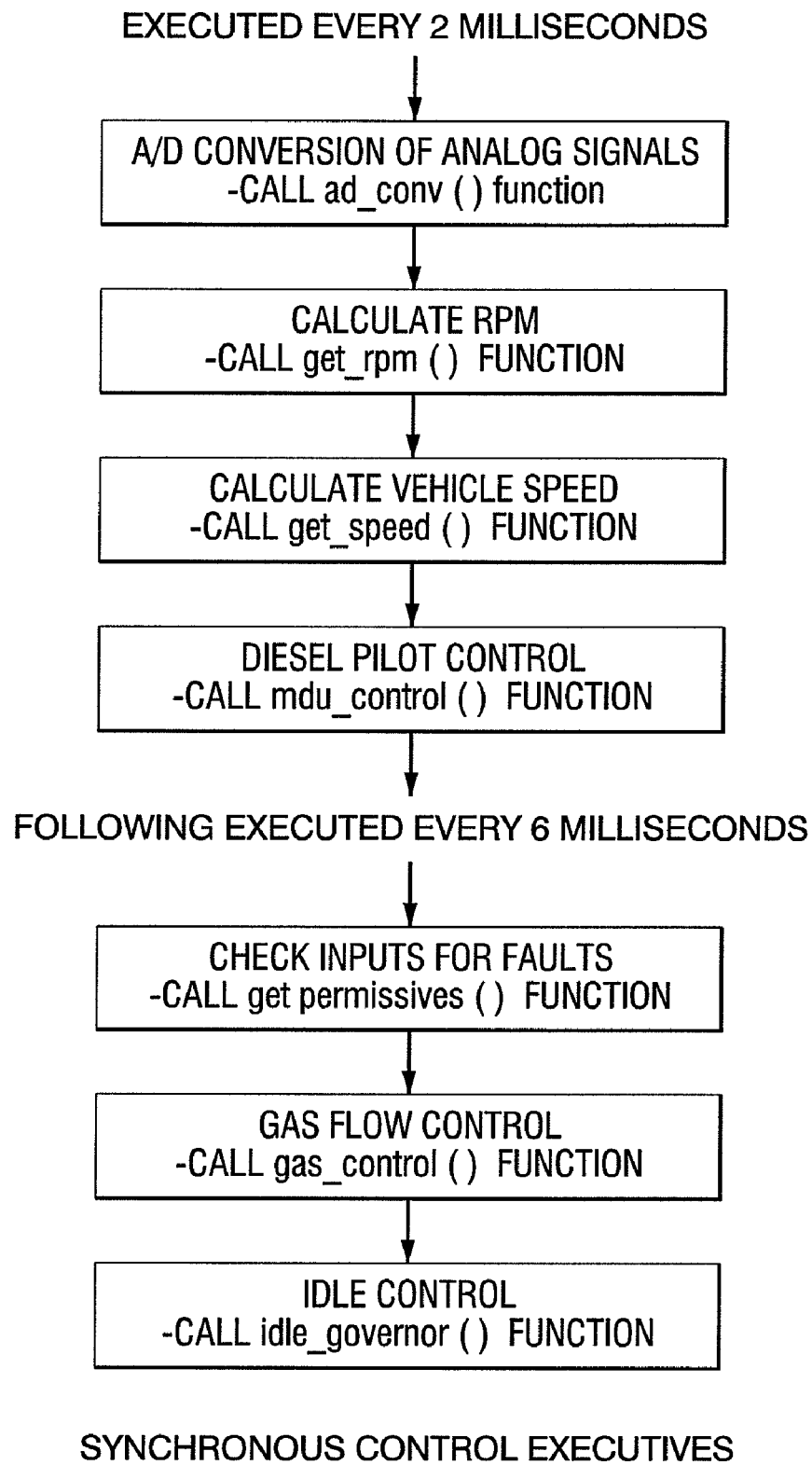
FIG. 9 is a flow diagram showing the ECU software control executive for a mechanically governed engine.

In accordance with an embodiment of the present invention, FIG. 9 presents a flow diagram for a synchronous control executive. The control executive performs all tasks related to the control of diesel and gas fuels. Various engine parameters may be read, such as throttle position, exhaust temperature, gas pressure, gas temperature, r.p.m., and vehicle speed. Based on these readings, required diesel and gas supply may be calculated using injector pulse width and diesel pilot actuator position.

Figure 10A:
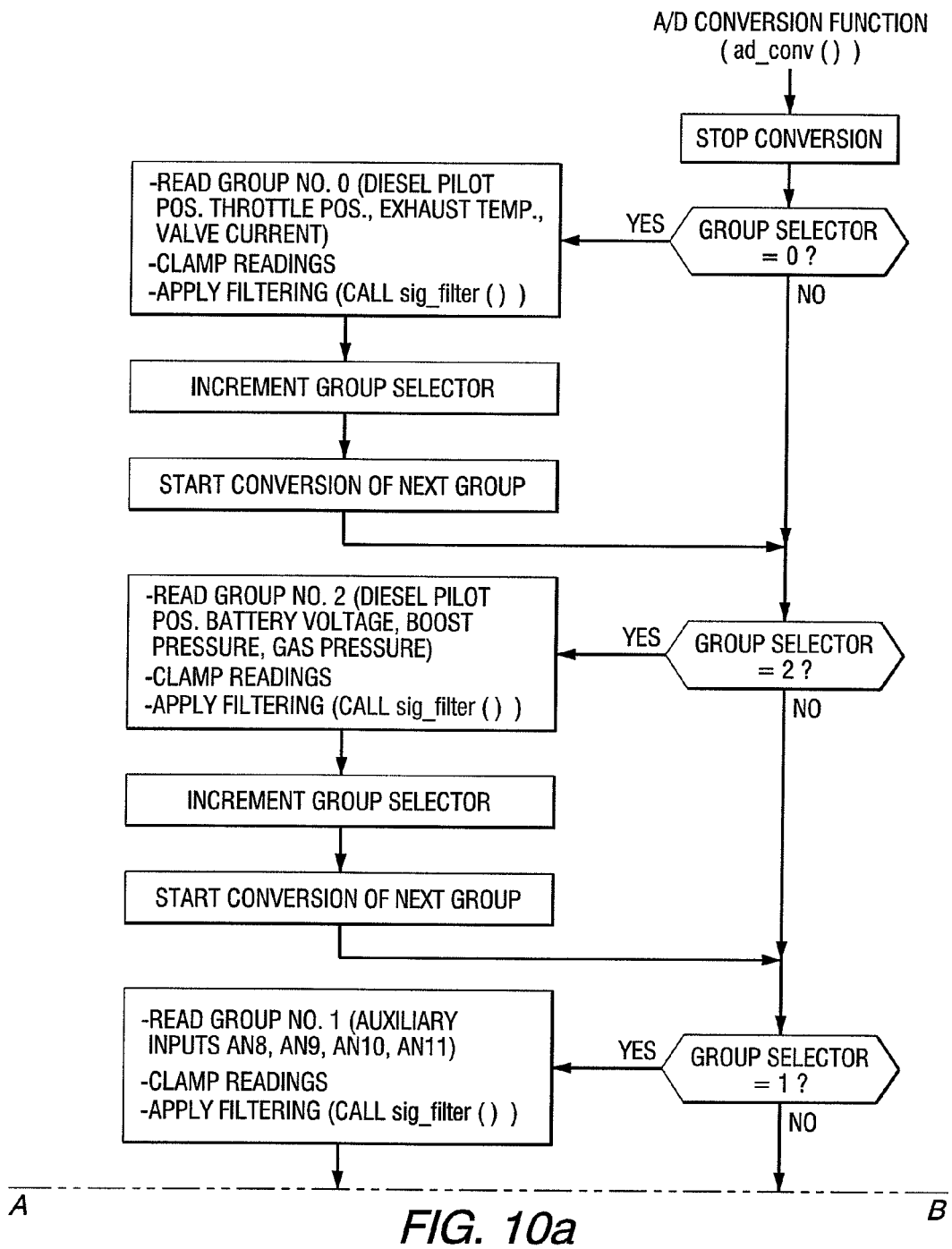
FIG. 10 is a flow diagram showing analog/digital (A/D) conversion of the ECU software for a mechanically governed engine.
Figure 10B:
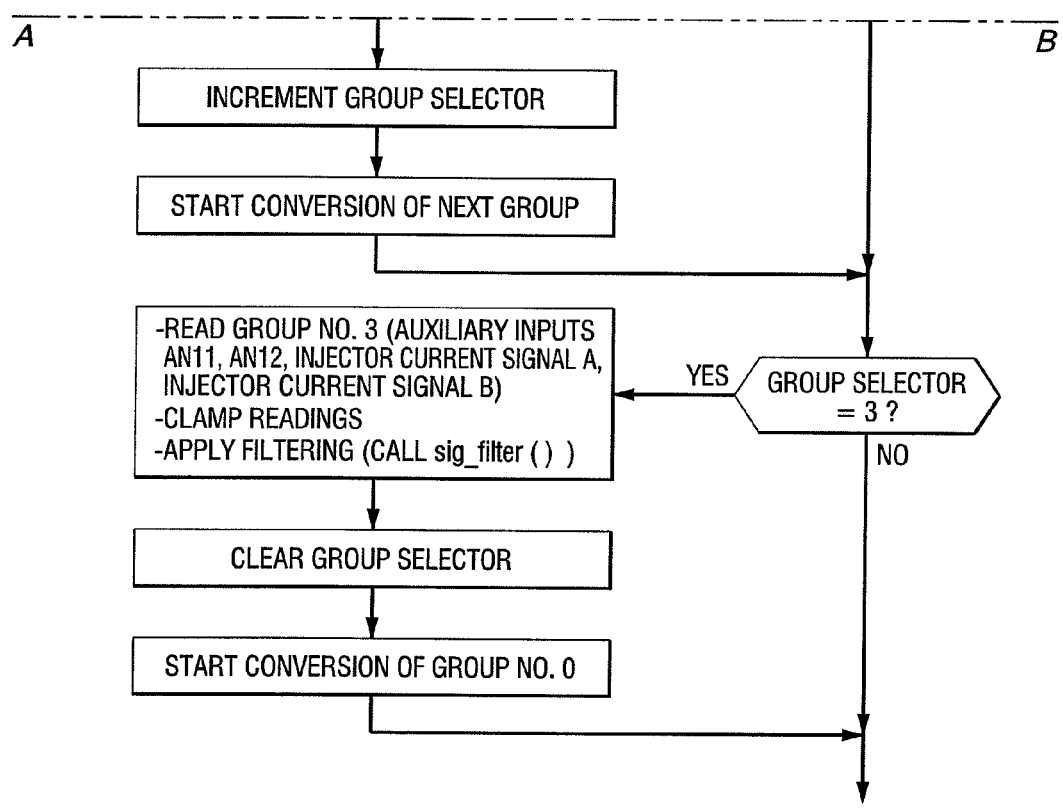

FIG. 10 is a flow diagram depicting typical analog/digital (A/D) conversion. Conversion of analog input is performed with the A/D converter working in scan mode; conversion may be accomplished for four inputs at one time.

Figure 11:
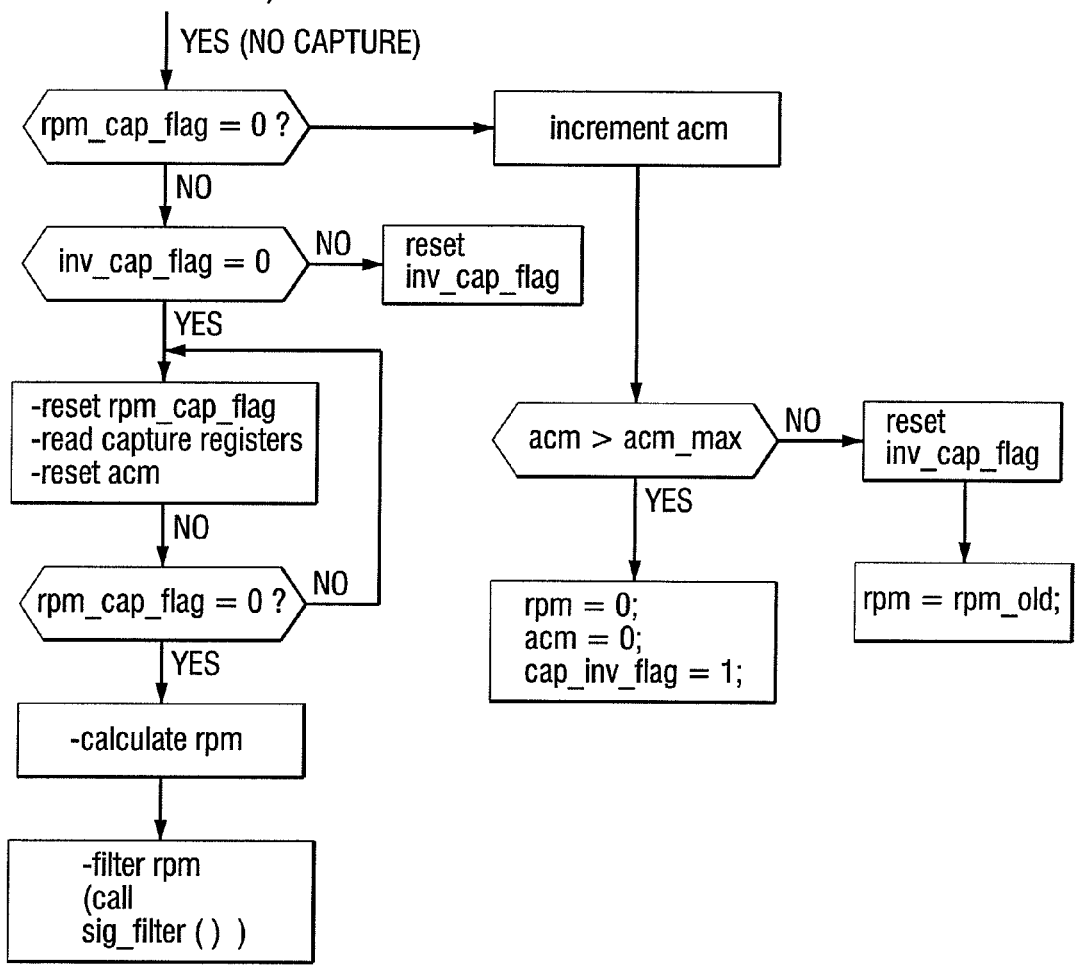
FIG. 11 is a flow diagram showing engine speed conversion for a mechanically governed engine.

In accordance with another embodiment of the present invention, FIG. 11 is a flow diagram depicting the engine speed conversion process for a mechanically governed engine. (For an electronically controlled engine, speed is read directly from the data link.) In this embodiment, engine speed is measured using a 16 bit free running counter in capture mode with buffering. An external pulse captures the current value of the counter and stores it in a capture register. The value previously held in the capture register is transferred to a buffer register. A flag is set indicating that the capture event has taken place. The function get_rpm( ) (shown in FIG. 11) contains an algorithm that calculates r.p.m. using the previous capture value of the buffer register, the new capture value of the capture register, the counter frequency, and the number of flywheel teeth. This function may be called from within the synchronous control executive every 2 milliseconds.

The engine conversion algorithm may also include protection against faulty results in case the frequency of the input signal becomes so low that the counter has time to loop around. Rpm_cap_flag (see FIG. 11) is a capture flag that is set when the capture event is detected. Each time the function runs and the capture is not detected, the variable "acm" is incremented. If the capture is not detected for "acm_max" times, then the rpm is considered to be zero. For 120 flywheel teeth and acm_max variable set at 4, the minimum measurable rpm is approximately 60.

Figure 12:
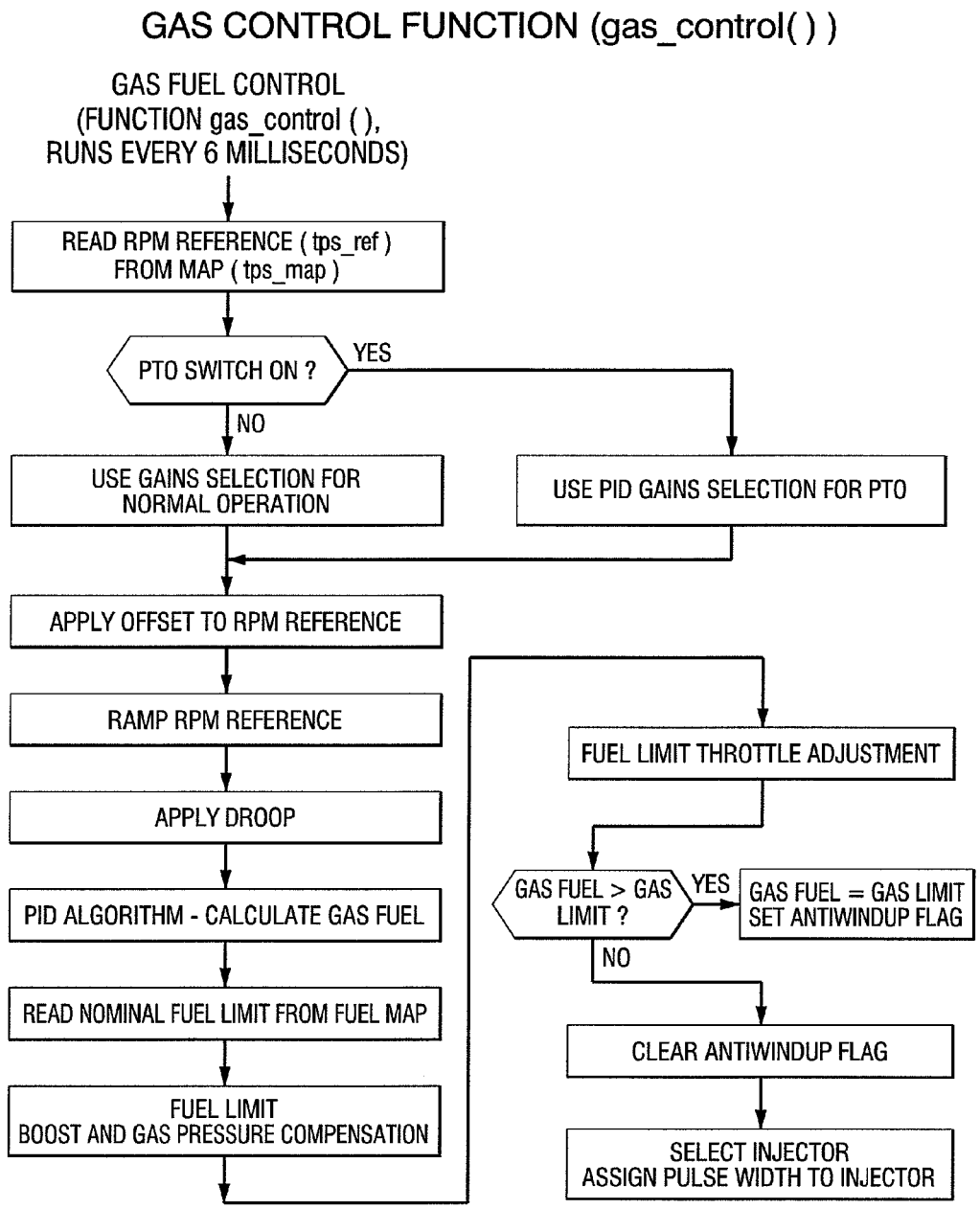
FIG. 12 is a flow diagram showing the gas fuel control function of the ECU software for a mechanically governed engine.

In accordance with a further embodiment, FIG. 12 presents a typical flow diagram for the gas control function. Because the system may be installed without removing the existing mechanical governor, the speed governing characteristics of the dual fuel engine is preferably programmed close to, but not higher than, that of the mechanical governor. The mechanical governor characteristic may be stored in the ECU's map called tps_map when the system is calibrated. The map contains multiple values throughout the r.p.m. range. For stability reasons, an offset may be applied to the characteristics as shown in FIG. 12. The offset applied is usually 20 to 200 r.p.m. A separate algorithm may govern the engine at low idle; the r.p.m. reference used by that function may be set as shown in FIG. 12.

Different PID settings may be used in PTO mode for stability reasons. Gas fuel limiting may be applied to prevent the engine from over fueling. A fuel limiting curve may be stored in EEPROM memory with one point for every 32 r.p.m. The range of values is generally 0 to 27000, corresponding to an injector pulse with the range of 0 to 90%. For a given r.p.m., the program may read two neighboring fuel curve points and calculate the fuel limit using linear interpolation. The fuel limit may be further recalculated with consideration of boost, gas pressure, and gas temperature. Finally, the fuel limit may be multiplied by percentage of throttle position, providing a fuel control feature in addition to PID speed control.

Figure 13:
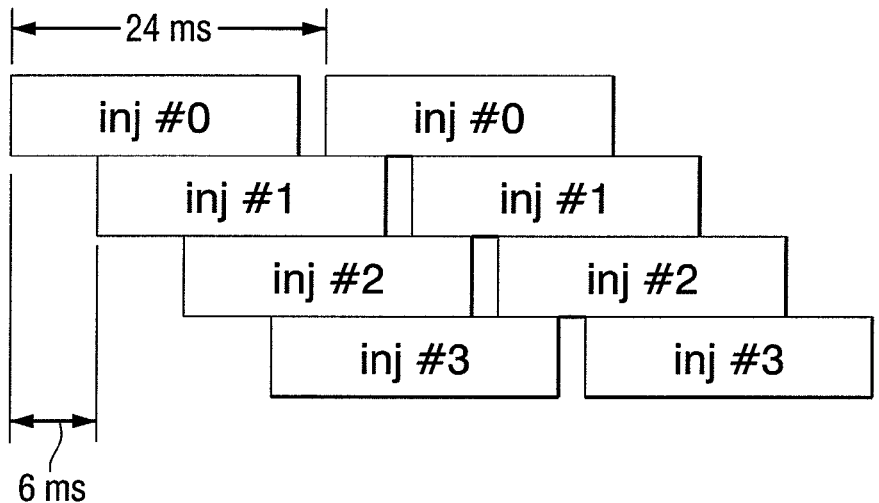
FIG. 13 is a schematic diagram depicting injector pulse.

The calculated value may be assigned to injectors, one injector at a time. If manifold injection is used, the injectors may operate sequentially as shown in FIG. 13. The maximum injector pulse width used is 90%.

Figure 14:
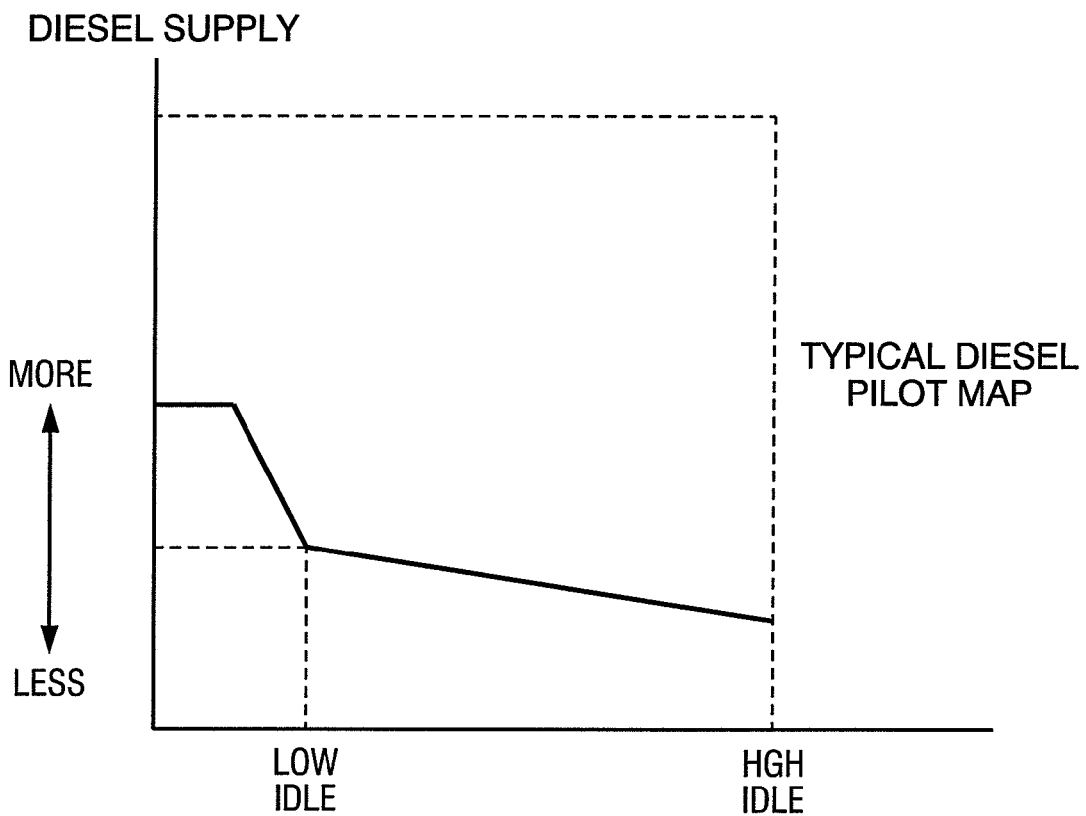
FIG. 14 is a diesel pilot map of diesel supply versus idle.

FIG. 14 presents a typical diesel pilot map for a mechanically governed engine. The map represents the position of the diesel pilot lever on the pump at low idle when there is no load on the engine, and at high idle when there is a load on the engine. As shown, the diesel supply typically increases at low idle to avoid engine stall and may decrease at high idle. The diesel pilot control function (FIG. 9) ensures that the diesel fuel supply follows the diesel fuel map stored in EEPROM memory during calibration. In a particular embodiment, the diesel fuel map holds 128 points.

Figure 15A:
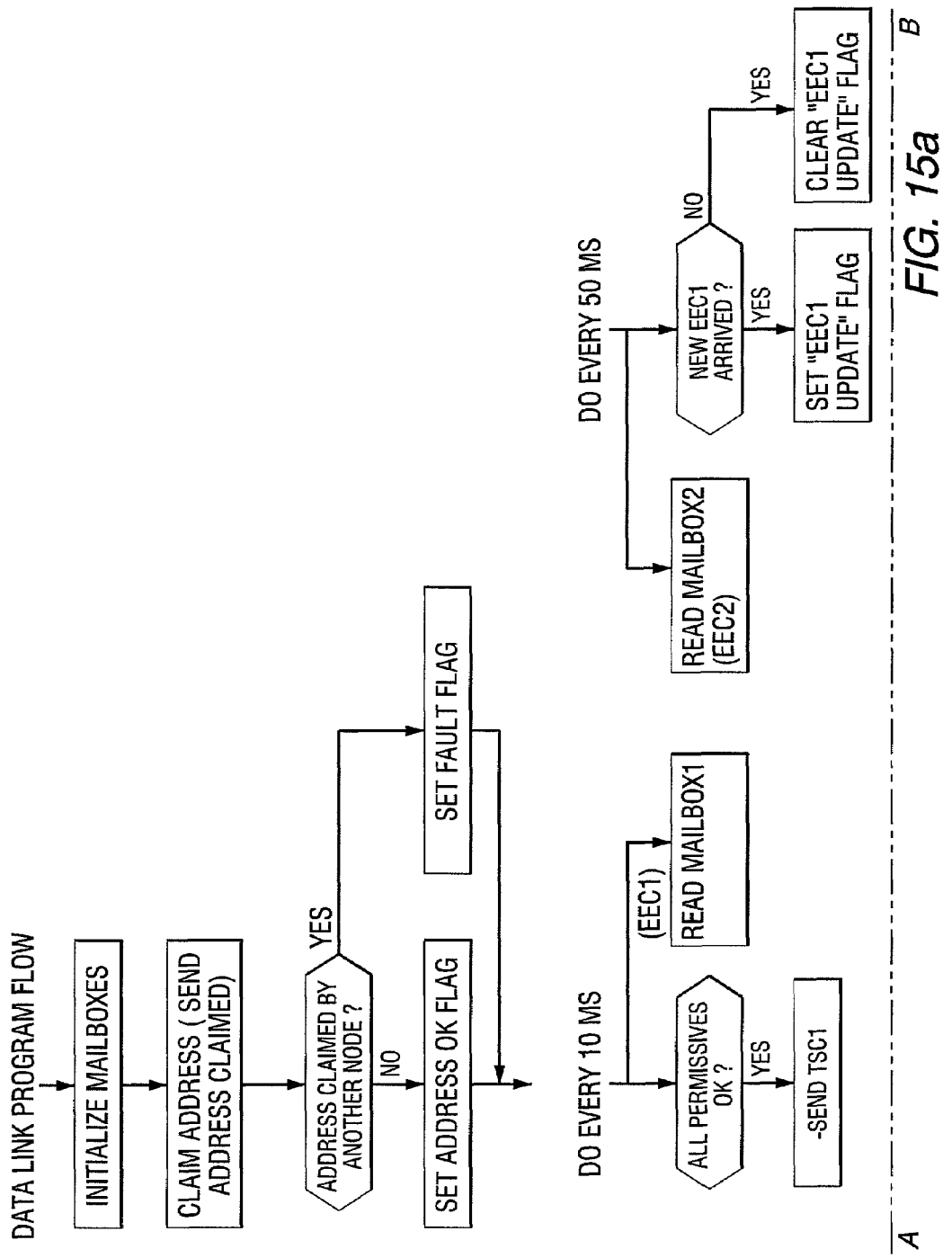
FIG. 15 is a flow diagram showing the overall ECU software structure specific for an electronically controlled system.
Figure 15B:
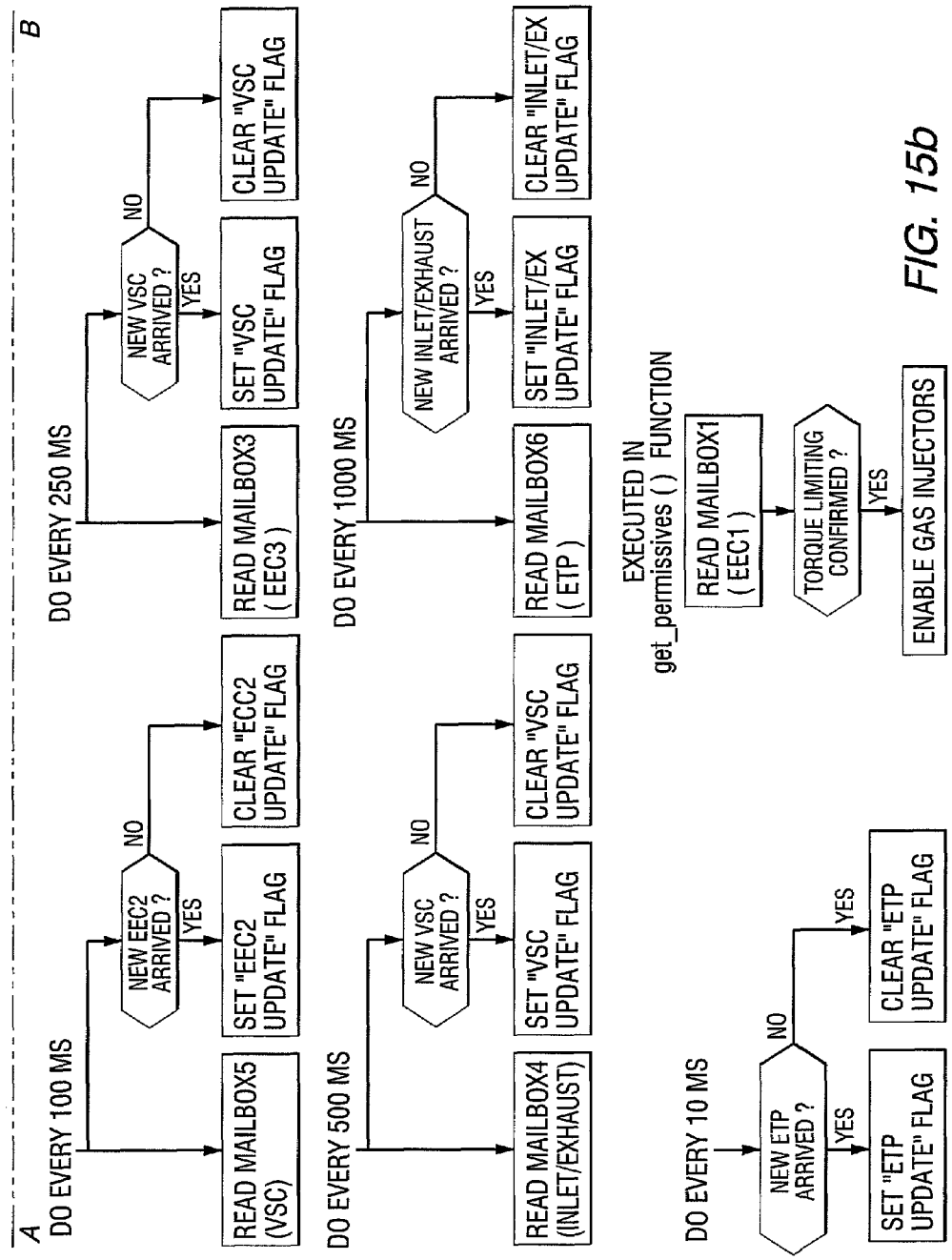

FIG. 15 depicts the structure of ECU software for an electronically controlled engine. In these systems, the ECU may be connected via an SAE J1939 data link with the OEM controller, taking advantage of the existing sensors and exercising control over the diesel fuel delivery through the OEM controller.

The ECU software for electronically controlled systems is structured similarly to the mechanically governed system software. However, several key engine parameters such as vehicle speed, engine speed, coolant temperature, ambient temperature and pressure, and manifold temperature and pressure may be obtained from the data link without reading them from the ECU's dedicated sensors. The ECU determines the desired diesel fuel percentage and sends a request to limit the diesel fuel to this level.

The CAN module in the ECU utilizes mailboxes for communication. The mailboxes may be configured during ECU initialization as shown in the following table, for receiving or transmitting various J1939 parameter groups.

| Receiver (Rx)/Transmit (Tx) | Parameter Group |
| --- | --- |
| Rx | REQUEST ADDRESS CLAIMED |
| Rx | EEC1 |
| Rx | EEC2 |
| Rx | EEC3 |
| Rx | AMBIENT CONDITIONS |
| Rx | CRUISE CONTROL/VEHICLE SPEED |
| Rx | ENGINE TEMPERATURE |
| Rx | POWER TAKEOFF INFORMATION |
| Rx | DM1 |
| Rx | BAM |
| Rx | ADDRESS CLAIMED |
| Tx | TSC1 |
| Tx | TSC1 |
| Tx | ADDRESS CLAIMED |

Other parameters may also be received depending on availability.

Multiple fuel engine conversion takes approximately one day to complete. It may be used among other things, to convert the engines of light, medium and heavy-duty diesel and gasoline vehicles, both on-road and off-road, to retrofit aftermarket mechanical and electronic engines, or to convert direct injected diesel or gasoline engines, both turbo-charged and naturally injected.

Whereas particular embodiments of this invention have been described above for purposes of illustration, it will be evident to those skilled in the art that numerous variations of the details of the present invention may be made without departing from the invention as defined in the appended claims.

What is claimed is:

1. An electronic control unit for a multiple fuel engine utilizing a first fuel and a second fuel, the electronic control unit comprising:

an input that receives operating characteristics from an electronically controlled engine system, wherein at least one of the operating characteristics comprises gas pressure of the second fuel, gas temperature of the second fuel, boost pressure of an intake manifold, or engine coolant temperature; and at least one output that controls amounts of the first fuel and the second fuel for delivery to the multiple fuel engine based on at least one of the operating characteristics, wherein an operating speed of the engine is maintained below a predetermined governed speed of the engine corresponding to a governed speed of the engine when the engine is only utilizing the first fuel.

* * * * *

UNITED STATES PATENT AND TRADEMARK OFFICE
CERTIFICATE OF CORRECTION

PATENT NO. : 7,509,209 B2
APPLICATION NO. : 11/751192
DATED : March 24, 2009
INVENTOR(S) : Frank J. Davis et al.

It is certified that error appears in the above-identified patent and that said Letters Patent is hereby corrected as shown below:

Title Page
Item (74) Attorney, Agent, or Firm should read
Alan G. Towner, Esq., Pietragallo Gordon Alfano Bostick & Raspanti, LLP Signed and Sealed this Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,509,209 B2  Page 1 of 1
APPLICATION NO. : 11/751192
DATED : March 24, 2009
INVENTOR(S) : Frank J. Davis et al.

It is certified that error appears in the above-identified patent and that said Letters Patent is hereby corrected as shown below:

Title Page
Item (74) Attorney, Agent, or Firm should read
Alan G. Towner, Esq., Pietragallo Gordon Alfano Bosick & Raspanti, LLP This certificate supersedes the Certificate of Correction issued November 10, 2009.

Signed and Sealed this

Twelfth Day of January, 2010

David J. Kappos
*Director of the United States Patent and Trademark Office*